(12) United States Patent
van der Merwe et al.

(10) Patent No.: US 10,753,455 B2
(45) Date of Patent: Aug. 25, 2020

(54) ADDITIVELY MANUFACTURED GEARBOX WITH INTEGRAL HEAT EXCHANGER

(71) Applicant: General Electric Company, Schenectady, NY (US)

(72) Inventors: Gert Johannes van der Merwe, Lebanon, OH (US); Raymond Floyd Martell, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/269,623

(22) Filed: Feb. 7, 2019

(65) Prior Publication Data

US 2019/0170239 A1 Jun. 6, 2019

Related U.S. Application Data

(63) Continuation of application No. 15/375,348, filed on Dec. 12, 2016, now Pat. No. 10,247,296.

(51) Int. Cl.
*F16H 57/04* (2010.01)
*F16H 57/02* (2012.01)
(Continued)

(52) U.S. Cl.
CPC ......... *F16H 57/0417* (2013.01); *B64D 33/08* (2013.01); *F01D 25/12* (2013.01); *F02C 7/14* (2013.01); *F16H 57/02* (2013.01); *F16H 57/0415* (2013.01); *F28D 7/005* (2013.01); *F28D 7/0041* (2013.01); *F02C 7/224* (2013.01); *F05D 2230/30* (2013.01); *F05D 2260/213* (2013.01); *F28F 2255/00* (2013.01); *F28F 2255/18* (2013.01)

(58) Field of Classification Search
CPC ...... F16H 57/02; F16H 57/04; F16H 57/0412; F16H 57/0413; F16H 57/0415; F16H 57/0417; F01D 25/12; F02C 7/14; F02C 7/224; F02C 7/32; F02C 7/36; B64D 33/08; F28F 2255/00; F28F 2255/18; F28D 7/005; F01M 5/002; F05D 2220/323; F05D 2230/30; F05D 2260/213
See application file for complete search history.

(56) References Cited

U.S. PATENT DOCUMENTS 6,997,238 B1 2/2006 Ruthy et al.
7,141,812 B2 11/2006 Appleby et al.
(Continued)

FOREIGN PATENT DOCUMENTS

EP 2 161 479 A1 3/2010
EP 2 375 107 A1 10/2011
(Continued)

*Primary Examiner* — Adam D Rogers
(74) *Attorney, Agent, or Firm* — Dority & Manning, P.A.

(57) ABSTRACT

A gearbox and a method for additively manufacturing the gearbox are provided. The gearbox includes a housing having an integral heat exchanger additively manufactured within the housing. The heat exchanger includes a plurality of heat exchange passageways for transferring heat between two or more fluids. The heat exchanger is defined at any suitable location or locations within the housing, for example, within voids defined between the walls of the housing and components housed within housing, such as driveshafts, gears, bearings, etc.

16 Claims, 6 Drawing Sheets

(51) Int. Cl.
*F28D 7/10* (2006.01)
*F01D 25/12* (2006.01)
*B64D 33/08* (2006.01)
*F02C 7/14* (2006.01)
*F28D 7/00* (2006.01)
*F02C 7/224* (2006.01)

(56) References Cited

U.S. PATENT DOCUMENTS

| | | |
|---|---|---|
| 7,810,552 B2 | 10/2010 | Slaughter |
| 8,383,985 B2 | 2/2013 | Twelves, Jr. et al. |
| 8,695,543 B2 | 4/2014 | Adam et al. |
| 9,174,312 B2 | 11/2015 | Baughman et al. |
| 9,309,809 B2 | 4/2016 | Johnson et al. |
| 9,752,835 B2 | 9/2017 | Waldman et al. |
| 9,810,150 B2 | 11/2017 | Schmitz et al. |
| 10,107,555 B1 * | 10/2018 | Miller .................. F28D 7/0008 |
| 10,175,003 B2 * | 1/2019 | Sennoun .................. F28C 3/04 |
| 10,184,728 B2 * | 1/2019 | Sabo .................. B22F 3/1055 |
| 10,247,296 B2 * | 4/2019 | van der Merwe .. F16H 57/0417 |
| 2005/0126749 A1 | 6/2005 | Matti et al. |
| 2008/0095611 A1 | 4/2008 | Storage et al. |
| 2010/0242496 A1 | 9/2010 | Cass et al. |
| 2011/0146944 A1 | 6/2011 | Hand et al. |
| 2013/0236299 A1 | 9/2013 | Kinton et al. |
| 2015/0369372 A1 | 12/2015 | Hrdlichka et al. |
| 2016/0108814 A1 | 4/2016 | Schmitz |
| 2016/0115864 A1 | 4/2016 | Campbell et al. |
| 2016/0175934 A1 | 6/2016 | Lacy et al. |
| 2016/0231064 A1 | 8/2016 | Kironn et al. |
| 2016/0231068 A1 | 8/2016 | Schmitz et al. |
| 2016/0265850 A1 | 9/2016 | Kupiszewsk et al. |
| 2016/0333792 A1 | 11/2016 | Viel et al. |
| 2017/0089447 A1 | 3/2017 | Uesugi et al. |
| 2017/0198637 A1 | 7/2017 | Cerny et al. |
| 2017/0198974 A1 | 7/2017 | Cerny et al. |
| 2017/0205146 A1 | 7/2017 | Turney et al. |
| 2018/0058472 A1 | 3/2018 | Tajiri et al. |
| 2018/0058473 A1 | 3/2018 | Kenworthy et al. |
| 2018/0100702 A1 | 4/2018 | Veilleux, Jr. et al. |
| 2018/0345425 A1 * | 12/2018 | Caimano .................. B23P 15/26 |
| 2019/0134894 A1 * | 5/2019 | Vadder .................. B28B 1/001 |
| 2019/0154345 A1 * | 5/2019 | Martinez ............... F28D 7/0033 |

FOREIGN PATENT DOCUMENTS

| | | |
|---|---|---|
| EP | 2 942 489 A1 | 11/2015 |
| GB | 2521913 A | 7/2015 |
| WO | 2015091729 | 6/2015 |

* cited by examiner

ADDITIVELY MANUFACTURED GEARBOX WITH INTEGRAL HEAT EXCHANGER

CROSS-REFERENCE TO RELATED APPLICATIONS

This application is a division of U.S. application Ser. No. 15/375,348, filed on Dec. 12, 2016, titled "ADDITIVELY MANUFACTURED GEARBOX WITH INTEGRAL HEAT EXCHANGER", which is herein incorporated by reference.

FIELD

The present subject matter relates generally to gearboxes for gas turbine engines, and more particularly, to gearboxes including integral heat exchangers.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in contact or close proximity, allowing heat from the first fluid to be passed to the second fluid. Thus, the temperature of the first fluid may be decreased and the temperature of the second fluid may be increased.

Conventional heat exchangers for gas turbine engines are modules or "bricks" that are positioned at various locations within the gas turbine engine. Fluids are supplied to and from the heat exchanger through one or more fluid circulation conduits. For example, certain gas turbine engines have a heat exchanger for transferring heat from oil heated within an accessory gearbox to fuel that is to be supplied to a combustion section of the gas turbine engine. However, the heat exchanger is located remotely from the accessory gearbox, requiring oil and fuel to be supplied to the heat exchanger through separate fluid circulation conduits. Each conduit requires additional component storage, assembly, and costs. In addition, the likelihood of leaks increases and significant heat energy may be lost from the fluids as they are transferred to the remotely located heat exchanger.

Accordingly, a gas turbine engine with an improved heat exchanger configuration for cooling oil within a gearbox would be useful. More particularly, a heat exchanger for a gas turbine engine that requires less space, is easier to assemble and install, and has a reduced likelihood of fluid leaks and thermal losses would be especially beneficial.

BRIEF DESCRIPTION

Aspects and advantages of the invention will be set forth in part in the following description, or may be obvious from the description, or may be learned through practice of the invention.

In one exemplary embodiment of the present disclosure, a gearbox including a housing having a plurality of walls defining an internal chamber is provided. An additively manufactured heat exchanger is formed within the chamber on at least one of the plurality of walls, the heat exchanger including a plurality of heat exchange passageways.

In another exemplary aspect of the present disclosure, a method of forming a gearbox is provided. The method includes additively manufacturing a heat exchanger onto at least one wall of a gearbox housing, the heat exchanger including a plurality of heat exchange passageways.

In still another exemplary aspect of the present disclosure, an additively manufactured gearbox is provided. The gearbox includes a plurality of chamber walls defining a chamber and one or more gears positioned within the chamber, a plurality of voids being defined between the gears and the chamber walls. At least one heat exchanger is additively manufactured on the chamber walls to fill at least some of the plurality of voids, the heat exchanger including a plurality of heat exchanging walls, at least one of the heat exchanging walls having a thickness of less than four millimeters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
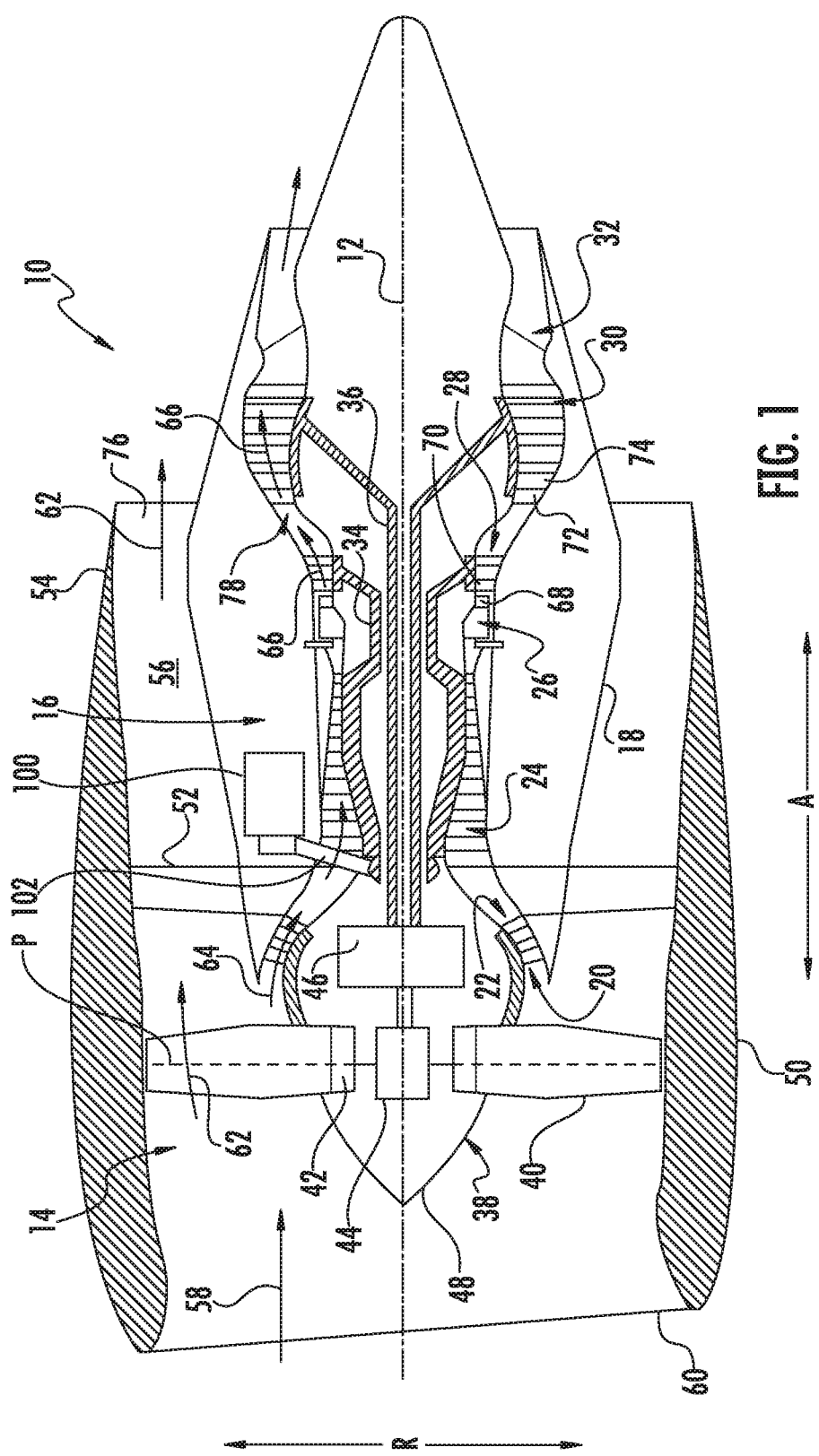
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "fluid" may be a gas or a liquid. The present approach is not limited by the types of fluids that are used. In the preferred application, the cooling fluid is fuel, and the cooled fluid is oil. For example, the oil can be cooled from an initial temperature to a discharge temperature, with the discharge temperature being about 90% of the initial temperature or lower (e.g., about 50% to about 90% of the initial temperature). The present approach may be used for other types of liquid and gaseous fluids, where the cooled fluid and the cooling fluid are the same fluids or different fluids. Other examples of the cooled fluid and the cooling fluid include air, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

An additively manufactured gearbox is generally provided along with a method for additively manufacturing such a gearbox. The gearbox includes a housing having an integral heat exchanger including a plurality of heat exchange passageways for transferring heat between two or more fluids. The heat exchanger is defined at any suitable location or locations within the housing, for example, within voids defined between the walls of the housing and components housed within housing, such as driveshafts, gears, bearings, etc.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may further include an accessory gearbox 100. Accessory gearbox 100 is generally configured for supporting operation of various accessory systems of turbofan 10 or an associated aircraft by harnessing power from the HP spool 34 or LP spool 36 through an input shaft 102, as described below. Although the description below refers to the construction of accessory gearbox 100, it should be appreciated that accessory gearbox 100 is used only for the purpose of explaining aspects of the present subject matter. The concepts disclosed herein could be similarly applied to other gearboxes, such as a transfer gear box, power gear box 46, a reduction gearbox, or to any other component of turbofan 10. Indeed, aspects of the present subject matter may be applied to form components used in automotive, aviation, maritime, and other industries to assist in heat transfer between fluids.

Figure 2:
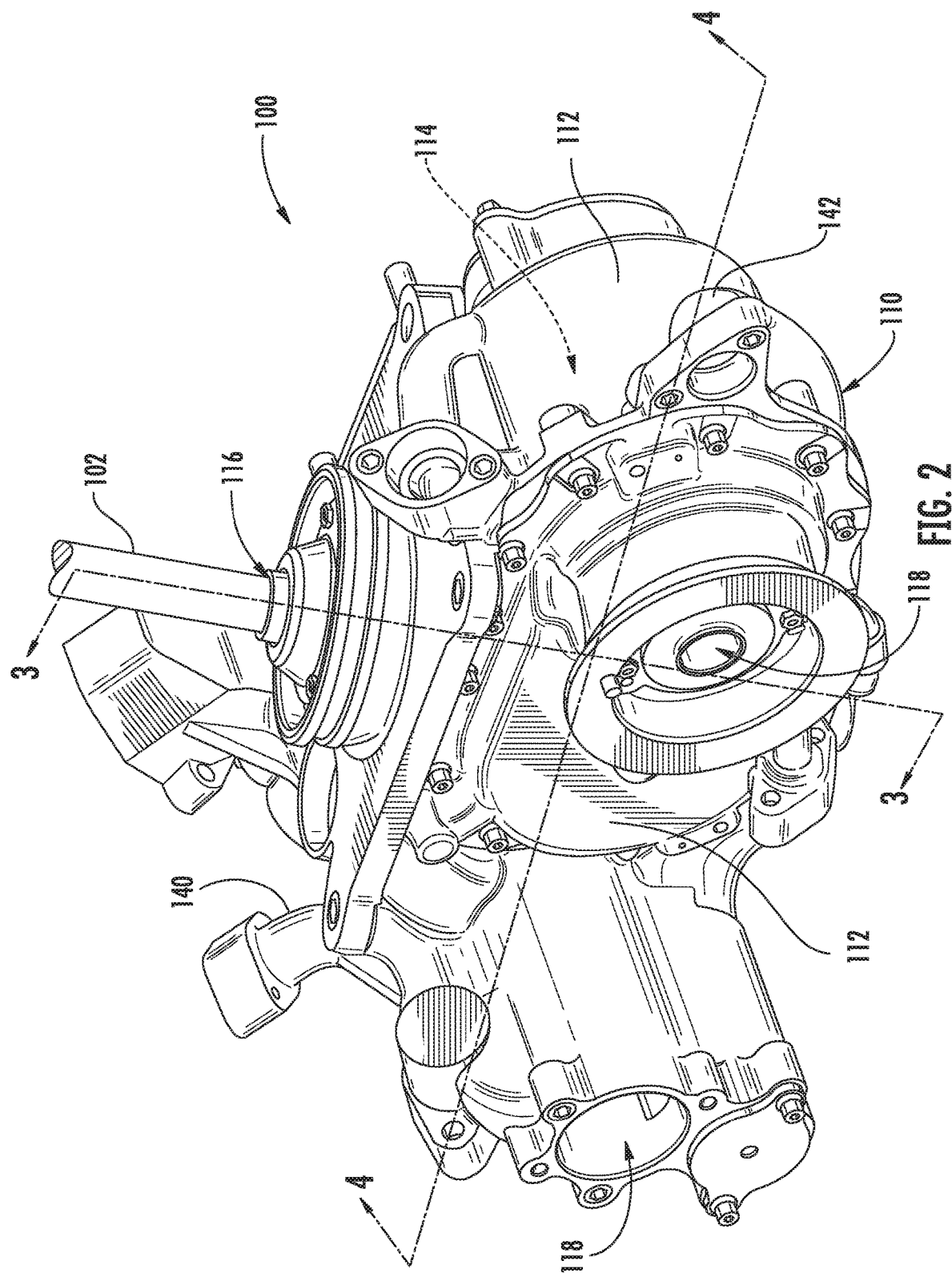
FIG. 2 is a perspective view of an accessory gearbox of the exemplary gas turbine engine of FIG. 1 in accordance with an exemplary embodiment of the present disclosure.
Figure 3:
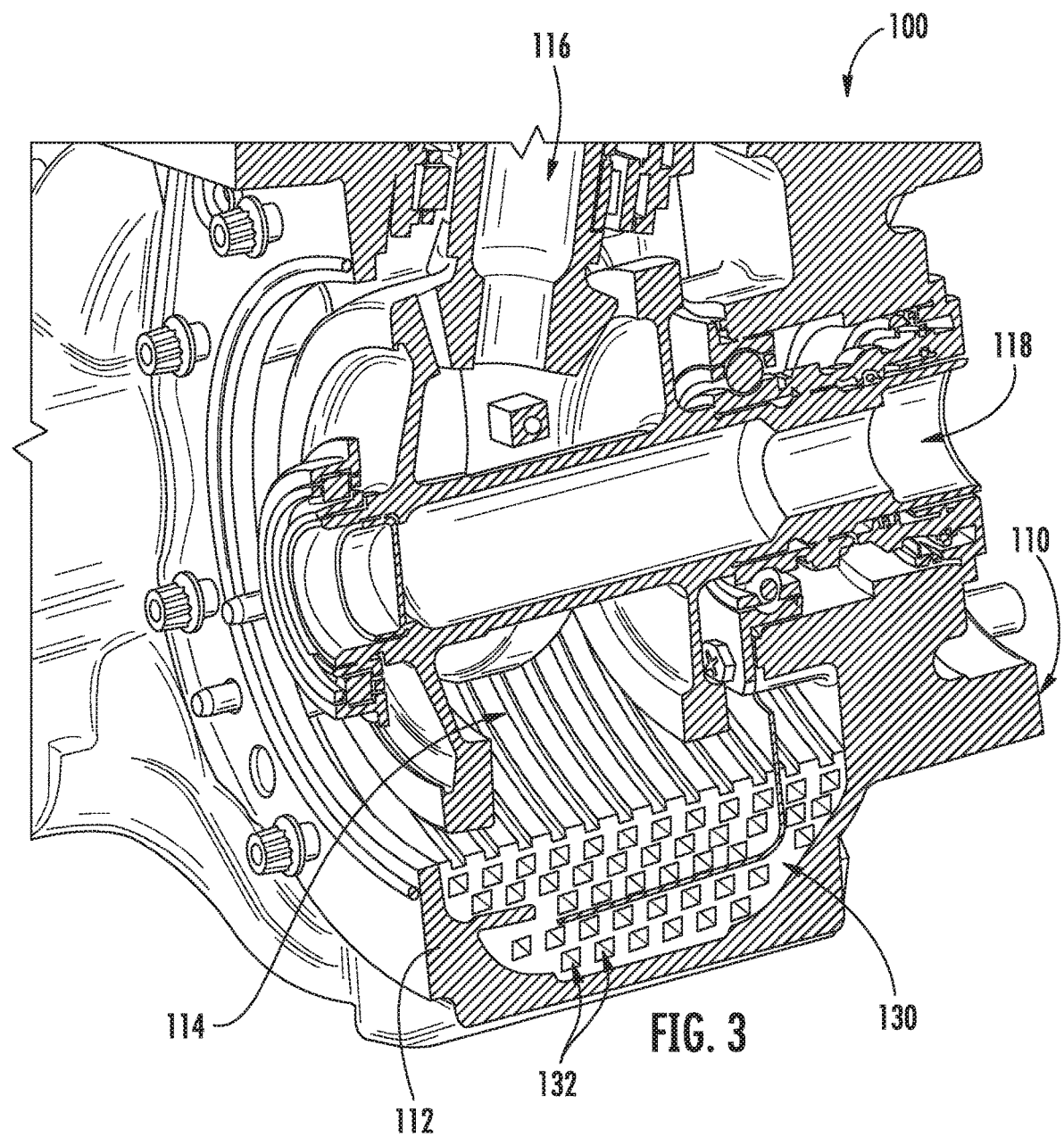
FIG. 3 is a cross-sectional view of the exemplary accessory gearbox of FIG. 2, taken along Line 3-3 of FIG. 2.
Figure 4:
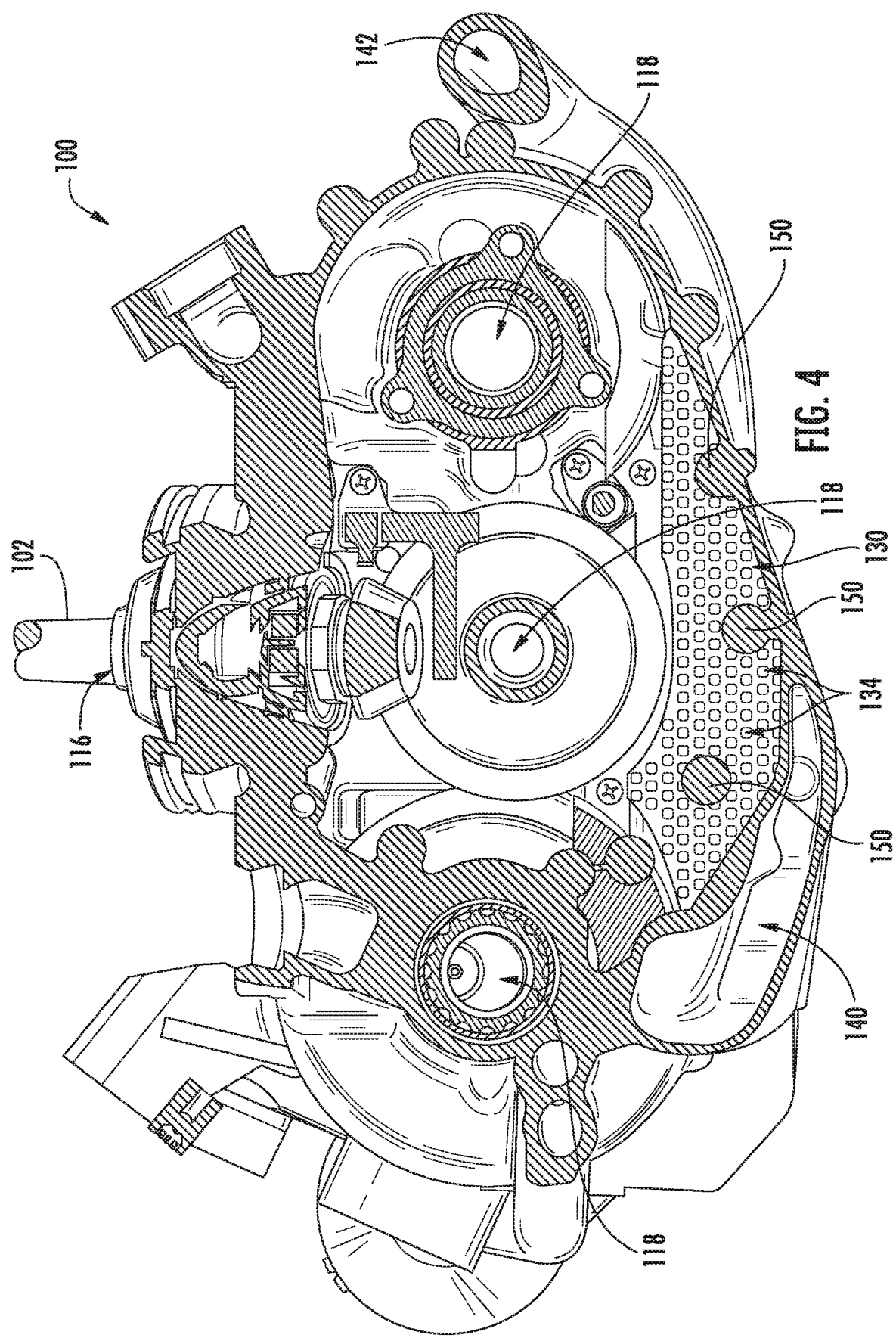
FIG. 4 is a cross-sectional view of the exemplary accessory gearbox of FIG. 2, taken along Line 4-4 of FIG. 2.
Figure 5:
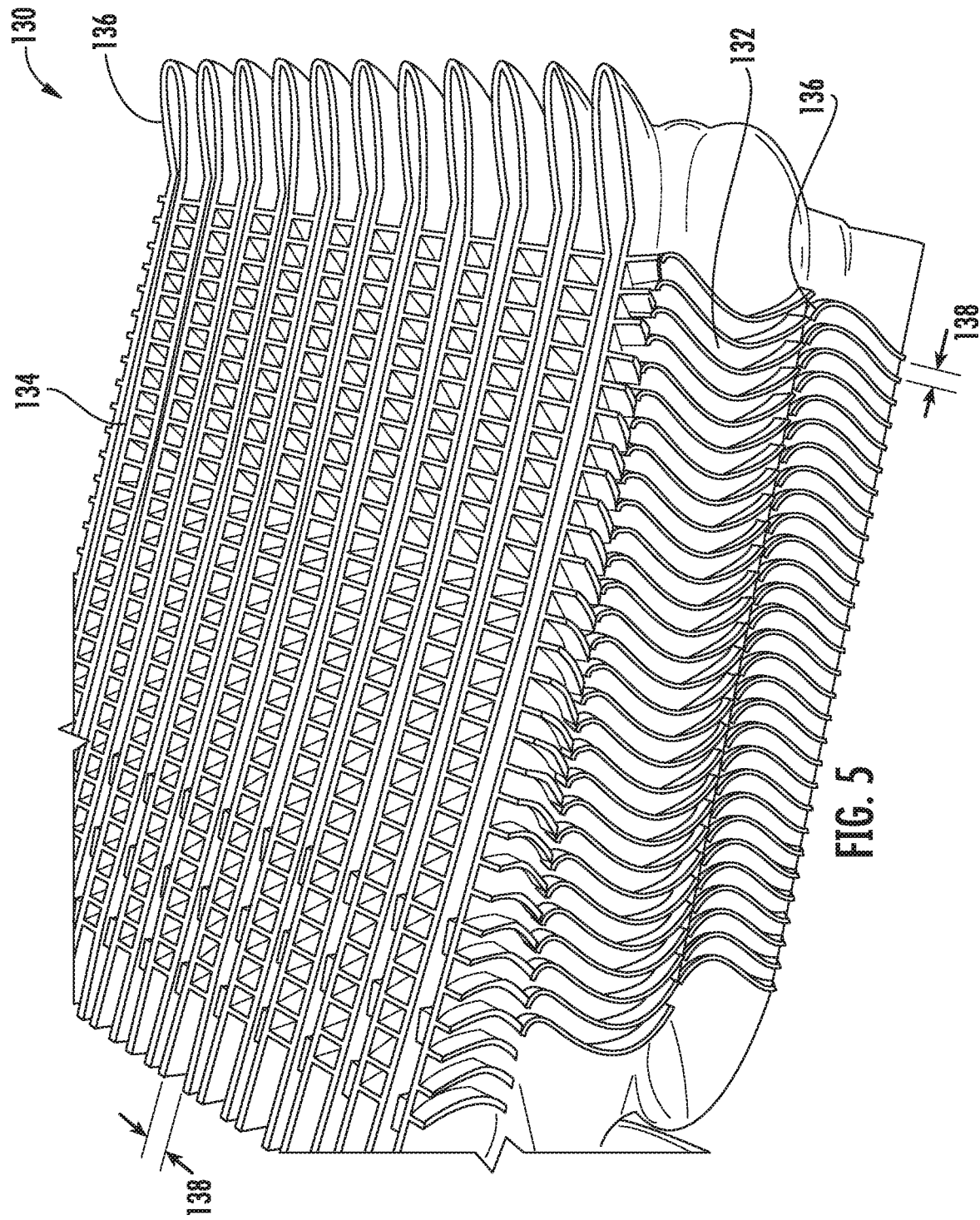
FIG. 5 is a perspective view of a heat exchanger configuration that may be used in the exemplary gearbox of FIG. 2 in accordance with an exemplary embodiment of the present subject matter.

Referring now to FIGS. 2 through 5, accessory gearbox 100 will be described according to an exemplary embodiment of the present subject matter. More specifically, FIG. 2 provides a perspective view of accessory gearbox 100, while FIGS. 3 and 4 provide cross sectional views of accessory gearbox 100 taken along Lines 3-3 and 4-4, respectively, of FIG. 2. FIG. 5 provides an exemplary heat exchanging structure that could be integrally formed within accessory gearbox 100 according to an exemplary embodiment of the present subject matter. It should be appreciated that accessory gearbox 100 and the associated heat exchanging structure are described herein only for the purpose of explaining aspects of the present subject matter. Variations and modifications may be made to the heat exchanging structure, which may be used within any suitable component of any suitable machine while still remaining within the scope of the present subject matter.

Referring now to FIG. 2, accessory gearbox 100 includes a housing 110 having a plurality of walls 112. More specifically, walls 112 collectively define an internal chamber 114 of accessory gearbox 100 which may house a plurality of gears, driveshafts, bearings, and one or more heat exchangers or heat exchanging surfaces, as will be described below. Input shaft 102 may extend from the core engine (e.g., from HP spool 34 of turbofan 10) into accessory gearbox 100 and may be rotatably coupled to a gear train or assembly (not shown) for driving various accessory systems. More specifically, housing 110 may define an input port 116 through which input shaft 102 extends into internal chamber 114 in a fluid tight manner for transmitting rotational force to the gear train.

Housing 110 of accessory gearbox 100 may further define a plurality of output ports 118 for receiving output shafts (not shown). The output shafts are operably coupled with the input shaft 102 through the gear train and are configured for transmitting rotational power to accessory systems of turbofan 10 or another suitable device. For example, input shaft 102 may be configured for transferring rotational power from the HP spool 34 to rotate drive gears and driveshafts for a fuel pump, a hydraulic pump, or any other suitable accessory system. Accessory gearbox 100 may further include any suitable fluid seals, bearings, or other support structures to allow input shaft 102 and output shafts to rotate freely and in a fluid tight manner.

Notably, the gear train and housing 110 generate a significant amount of heat during operation due to the interaction and friction between the various gears, shafts, bearings, etc. To provide lubrication and reduce heat generation, oil is contained within internal chamber 114. It is often desirable to transfer heat from the oil within accessory gearbox 100 to a separate, second fluid. Reducing the temperature of the oil extends the life of the oil and of the components, e.g., gears, which it lubricates. In addition, heat from the oil may be transferred to the second fluid for useful purposes.

Conventional methods of reducing the temperature of oil within an accessory gearbox include pumping the oil from a chamber of the gearbox through a fluid conduit to an external heat exchanger. The heat exchanger passes a second flow of cooling fluid, e.g., fuel, through a separate channel or passageway through the heat exchanger. The relatively hot oil and the relatively cool fuel is in thermal communication as they are passed through the heat exchanger, such that heat is transferred from the relatively hot oil to the relatively cool fuel. The cooled oil is then circulated back through the chamber of the gearbox and the process continues.

However, as explained above, the remote positioning of these conventional heat exchanging modules requires additional housing space within the gas turbine engine. In addition, fluids must be circulated through separate fluid circulation conduits that must be assembled using seals, bolts, nuts, etc. Thus, each conduit requires additional component storage, assembly, and costs. In addition, the likelihood of leaks increases and significant heat energy may be lost from the fluids as they are transferred to the remotely located heat exchanger. Therefore, the present subject matter provides a more efficient and less complicated way of cooling oil within an accessory gearbox without expanding the footprint of the previously existing gearbox. Although the heat exchanging configuration described herein contemplates cooling of an oil stream (e.g., the hot stream) with a fuel stream (e.g., the cold stream), the heat exchanger configuration is broadly applicable to a variety of heat exchanger applications involving multiple fluid types.

Referring now to FIG. 3, a heat exchanger 130 may be incorporated into accessory gearbox 100 for exchanging heat between two or more fluids. For example, heat exchanger 130 may be formed within internal chamber 114 on at least one of walls 112 and may define multiple passageways that pass a relatively hot fluid and a relatively cool fluid for exchanging heat between the two fluids. Notably, heat exchanger 130 is positioned within internal chamber 114 in a void that is defined between the wall 112 of the chamber and the gears, shafts, bearings, etc. of accessory gearbox 100. As illustrated, heat exchanger 130 extends only along a bottom of housing 110. However, it should be appreciated that according to alternative embodiments, heat exchanger 130 may be positioned at any suitable location or locations within accessory gearbox 110. For example, if accessory gearbox 100 maintains the same footprint as prior gearboxes, heat exchangers 130 could fill some or all voids within internal chamber 114 of accessory gearbox 100. Alternatively, walls 112 of housing 110 could be thinned or the footprint of accessory gearbox 100 could be expanded to accommodate additional heat exchanger areas within accessory gearbox 100.

Referring now additionally to FIG. 5, an exemplary heat exchanger 130 will be described. Heat exchanger 130 may, according to some embodiments, be used in accessory gearbox 100. Notably, FIG. 5 illustrates an exemplary segment of heat exchanger 130 for the purpose of explaining its general operation, but the size, shape, and configuration of heat exchanger 130 is not intended to limit the scope of the present subject matter. For example, the size, shape, number, and configuration of fluid passageways may be varied while remaining within the scope of the present subject matter.

According to the illustrated embodiment, heat exchanger 130 includes a plurality of first fluid passageways 132 and a plurality of second fluid passageways 134. First and second fluid passageways 132, 134 are in thermal communication with each other for transferring heat between the fluids passing therethrough. Notably, however, first fluid passageways 132 and second fluid passageways 134 are separated from each other in that the respective fluids do not physically mix with each other. In this regard, each of first fluid passageways 132 and second fluid passageways 134 may be separated by a plurality of heat exchanger walls 136.

First fluid passageway 132 and second fluid passageway 134 generally define non-circular geometries, so as to increase the surface area available for thermal exchange. For example, according to the illustrated embodiment, first fluid passageway 132 and second fluid passageway 134 have a square cross-section. In this regard, each fluid passageway 132, 134 may have a height 138 that is defined as the average distance between the walls 136 that define the respective fluid passageway 132, 134. The additive manufacturing methods described below enable the formation of such fluid passageways 132, 134 at any suitable height. For example, according to one embodiment, height 138 is about fifteen millimeters. However, it should be appreciated, that first fluid passageway 132 and second fluid passageway 134 may have any suitable size and geometry. It should be appreciated, that as used herein, terms of approximation, such as "approximately," "substantially," or "about," refer to being within a ten percent margin of error.

Each of first fluid passageway 132 and second fluid passageway 134 may be straight, curvilinear, serpentine, helical, sinusoidal, or any other suitable shape. For example, as illustrated in FIG. 5, first fluid passageway 132 is curvilinear. Notably, heat exchanger 130 may generally include performance-enhancing geometries and heat exchanging features whose practical implementations are facilitated by an additive manufacturing process, as described below. For example, according to some exemplary embodiments, first fluid passageway 132 and second fluid passageway 134 may have a plurality of heat exchanges surfaces or features, e.g., fins (not shown), to assist with the heat transfer process.

First fluid passageways 132 may be configured for receiving a first fluid, e.g., oil. Similarly, second fluid passageways 134 may be configured for receiving a second fluid, e.g., fuel. However, it should be appreciated that any suitable fluids may be used in the heat transfer process. For example, air, fuel, oil, refrigerant, or any other suitable fluid may be used in the heat transfer process. In addition, heat exchanger 130 may be configured for having more than two fluid passageways.

According to the illustrated embodiment, first fluid passageway 132 and second fluid passageways 134 are configured in a cross-flow configuration, i.e., the oil and fuel flow perpendicular to each other. However, it should be appreciated that first fluid passageway 132 and second fluid passageway 134 could alternatively be configured in a counter-flow configuration, where heat exchanger 130 is designed such that the first fluid passageway 132 and second fluid passageway 134 are substantially parallel and the respective fluid streams travel in opposite directions in their respective passageways 132, 134. In addition, according to some embodiments, the fluids may travel in the same direction in their respective passageways 132, 134.

Referring again to FIGS. 2 through 4, accessory gearbox 100 may further define various fluid supply or circulation conduits for passing the various fluids to and within accessory gearbox 100. For example, according to the illustrated embodiment, housing 110 defines an oil supply conduit 140 and a fuel supply conduit 142 for supplying oil and fuel to the first fluid passageways 132 and second fluid passageways 134, respectively. Oil supply conduit 140 and fuel supply conduit 142 may be integrally formed, e.g., via additive manufacturing, within housing 110 and may extend between different sections of internal chamber 114 or may extend outside of accessory gearbox 100 to external reservoirs. In this regard, for example, oil supply conduit 140 may extend to an oil reservoir or to a sump within accessory gearbox 100. An oil pump may be operably coupled to the oil supply conduit 140 for circulating oil through accessory gearbox 100 and first fluid passageways 132. Similarly, fuel supply conduit 142 may extend to a fuel supply and a fuel pump can circulate fresh fuel into heat exchanger 130. After heat is transferred from the oil to the fuel, the fuel may be passed through fuel supply conduit 142 out of accessory gearbox 100, e.g., to combustion section 26 of turbofan 10.

The various portions of accessory gearbox 100 may be constructed using any suitable material, in any suitable geometry, density, and thickness, as needed to provide necessary structural support to accessory gearbox 100. For example, external walls 112 accessory gearbox 100 may be formed from a rigid, thermally insulating material. In addition, walls 112 may be thicker and denser to provide structural support for loads experienced by accessory gearbox 100 during mounting, assembly, and operation of gas turbine engine 100. By contrast, internal walls (e.g., walls 136 of heat exchange passageways 132, 134) may be thinner and constructed of a more thermally conductive material in order to enhance heat transfer. For example, according to an exemplary embodiment, walls of the heat exchange passageways 132, 134 may be constructed of a thermally conductive metal alloy and may be less than ten millimeters thick. According to still another exemplary embodiment, walls of heat exchange passageways may be less than four millimeters thick and may vary depending on the what fluid will be passed through the passageway.

Similarly, various surfaces within housing 110 may be constructed to provide structural support, e.g., by using a stronger material and/or increased density of a specific region to improve its structural capabilities. For example, according to one embodiment, one or more load-bearing surfaces 150 may be additively manufactured through a middle of heat exchanger 130 for providing structural support to accessory gearbox 100. Load-bearing surfaces 150 may be used to provide structural rigidity to housing 110 or to support components within accessory gearbox 100, such as a drive shaft or bearings.

Now that the construction and configuration of accessory gearbox 100 and heat exchanger 130 according to an exemplary embodiment of the present subject matter has been presented, an exemplary method 200 for forming a gearbox according to an exemplary embodiment of the present subject matter is provided. Method 200 can be used to form accessory gearbox 100, or any other suitable gearbox with an integral heat exchanger. It should be appreciated that the exemplary method 200 is discussed herein only to describe exemplary aspects of the present subject matter, and is not intended to be limiting.

Figure 6:
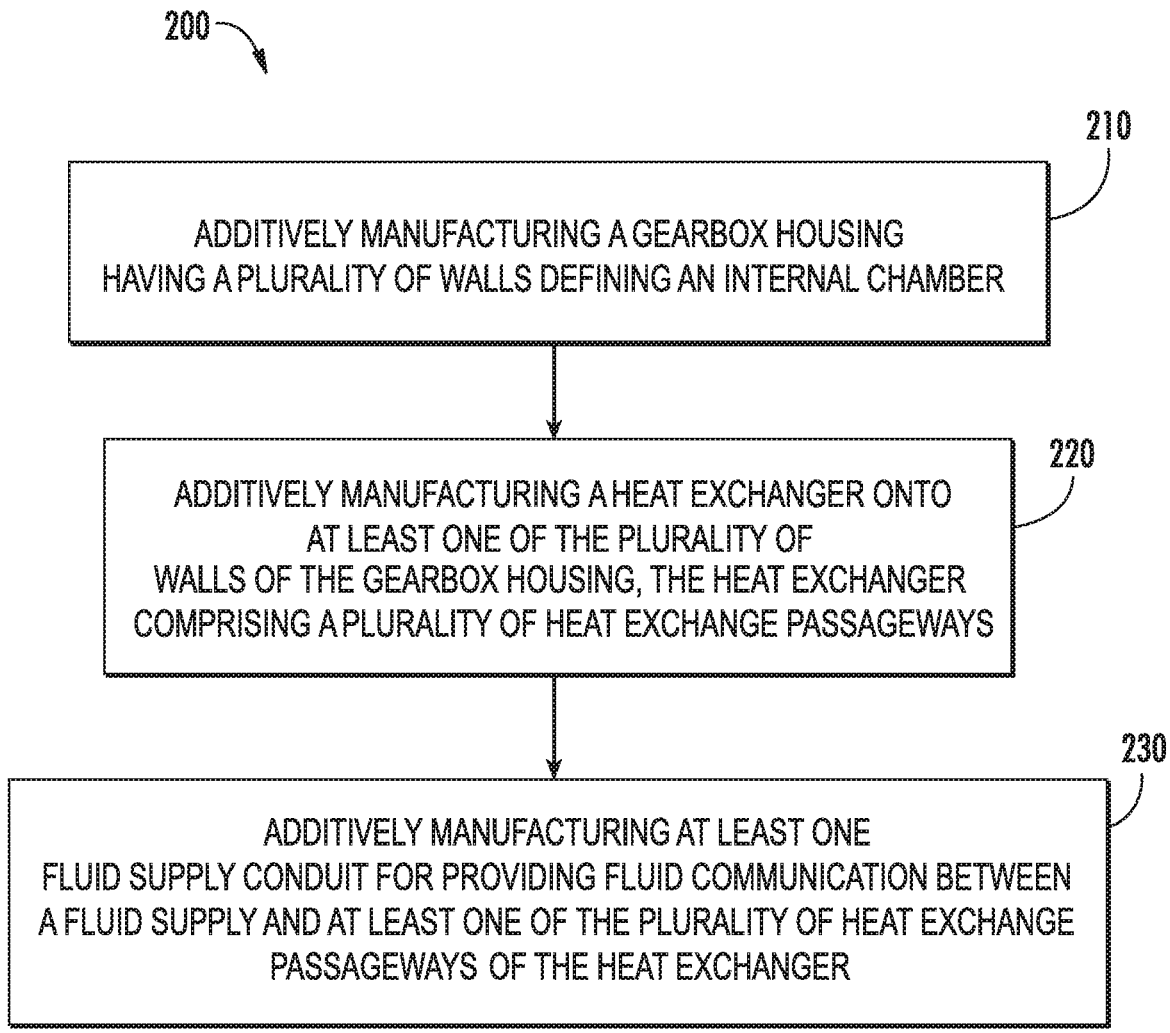
FIG. 6 is a method for forming a gearbox according to an exemplary embodiment of the present subject matter.

Referring now to FIG. 6, method 200 includes, at step 210, additively manufacturing a gearbox housing having a plurality of walls defining an internal chamber. Step 220 includes additively manufacturing a heat exchanger onto at least one of the plurality of walls of the gearbox housing. The heat exchanger is formed such that it includes a plurality of heat exchange passageways for passing one or more fluids. The gearbox housing and heat exchanger may be formed using the same or different materials. According to the illustrated exemplary embodiment, the gearbox housing and heat exchanger are formed integrally using additive manufacturing and a single material. According to alternative embodiments, however, the gearbox housing may instead be machined or cast prior to additively manufacturing the heat exchanger thereon. Method 200 further includes, at step 230, additively manufacturing at least one fluid supply conduit for providing fluid communication between a fluid supply and at least one of the plurality of heat exchange passageways of the heat exchanger. The fluid supply may be, for example, a fuel reservoir, and fuel from the reservoir may be passed through the heat exchanger to extract heat from the oil prior to passing onto a combustion section of a gas turbine engine.

In general, the disclosed accessory gearbox 100 may be manufactured or formed using any suitable process. However, in accordance with several aspects of the present subject matter, accessory gearbox 100 may be formed using an additive-manufacturing process, such as a 3-D printing process. The use of such a process may allow accessory gearbox 100 to be formed with an integral heat exchanger, as described above according to an exemplary embodiment. In other words, the heat exchanger may be formed as an integral structure within the gearbox. In particular, the manufacturing process may allow accessory gearbox 130 to be integrally formed and include a variety of features not possible when using prior manufacturing methods. Some of these novel features will be described below.

As used herein, the terms "additively manufactured" or "additive manufacturing techniques or processes" refer generally to manufacturing processes wherein successive layers of material(s) are provided on each other to "build-up", layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Metal Laser Sintering (DMLS), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, accessory gearbox 100 may be formed in part, in whole, or in some combination of materials including but not limited to pure metals, nickel alloys, chrome alloys, titanium, titanium alloys, magnesium, magnesium alloys, aluminum, aluminum alloys, and austenite alloys such as nickel-chromium-based superalloys (e.g., those available under the name Inconel® available from Special Metals Corporation).

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting process. One skilled in the art will appreciate other methods of fusing materials to make a component by additive manufacturing are possible, and the presently disclosed subject matter may be practiced with those methods.

In addition, the additive manufacturing process disclosed herein allows a single component to be formed from multiple materials. Thus, accessory gearbox 100 may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although accessory gearbox 100 is described above as being constructed entirely by additive manufacturing processes, it should be appreciated that in alternate embodiments, all or a portion of accessory gearbox 100 may be formed via casting, machining, and/or any other suitable manufacturing process. Indeed, any suitable combination of materials and manufacturing methods may be used to form accessory gearbox 100.

An exemplary additive manufacturing process will now be described. Additive manufacturing processes fabricate components using three-dimensional (3D) information, for example a three-dimensional computer model, of the component. Accordingly, a three-dimensional design model of accessory gearbox 100 may be defined prior to manufacturing. In this regard, a model or prototype of accessory gearbox 100 may be scanned to determine the three-dimensional information of accessory gearbox 100. As another example, a model of accessory gearbox 100 may be constructed using a suitable computer aided design (CAD) program to define the three-dimensional design model of accessory gearbox 100.

The design model may include 3D numeric coordinates of the entire configuration of the component including both external and internal surfaces of accessory gearbox 100. For example, the design model may define the housing, the heat exchanging structure, internal fluid channels or circulation conduits, openings, support structures, etc. In one exemplary embodiment, the three-dimensional design model is converted into a plurality of slices or segments, e.g., along a central (e.g., vertical) axis of the component or any other suitable axis. Each slice may define a two-dimensional (2D) cross section of the component for a predetermined height of the slice. The plurality of successive 2D cross-sectional slices together form the 3D component. The component is then "built-up" slice-by-slice, or layer-by-layer, until finished.

In this manner, accessory gearbox 100 is fabricated using the additive process, or more specifically each layer is successively formed, e.g., by fusing or polymerizing a plastic using laser energy or heat or by sintering metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the heat exchanging surfaces (e.g., walls 136) may be as thin as one thickness of an associated powder layer, e.g., 10 μm, utilized during the additive formation process. However, according to the exemplary embodiment, walls 136 of the heat exchanger may be formed at less than fifteen millimeters thick. According to still another exemplary embodiment, walls 136 may be less than five millimeters thick.

Notably, in exemplary embodiments, several features of accessory gearbox 100 are formed integrally with walls 112 of accessory gearbox 100 and may be made from the same material or a different material. Such construction of accessory gearbox 100 and heat exchanger 130 has previously not been possible due to manufacturing restraints. However, the present inventors have advantageously utilized current advances in additive manufacturing techniques to develop exemplary embodiments of accessory gearbox 100 generally in accordance with the present disclosure. While the present disclosure is not limited to the use of additive manufacturing to form accessory gearbox 100 generally, additive manufacturing does provide a variety of manufacturing advantages, including ease of manufacturing, reduced cost, greater accuracy, etc.

In this regard, utilizing additive manufacturing methods, accessory gearbox 100 may be a single piece of continuous plastic, and may thus include fewer components and/or joints than known gearboxes. The integral formation of accessory gearbox 100 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of accessory gearbox 100. For example, heat exchanger 130 may include thin walls (less than fifteen millimeters), narrow passageways, and novel heat exchanging features. All of these features may be relatively complex and intricate for maximizing heat transfer and minimizing the size or footprint of heat exchanger 130. In addition, the additive manufacturing process enables the manufacture of structures having different materials, specific heat transfer coefficients, or desired surface textures, e.g., that enhance or restrict fluid flow through a passageway. The successive, additive nature of the manufacturing process enables the construction of these passages and features. As a result, heat exchanger 130 performance may be improved relative to other accessory gearboxes with separate, dedicated heat exchanger assemblies.

Utilizing an additive process, the surface finish and passageway size may be formed to improve fluid flow through the passageways, to improve heat transfer within the passageways, etc. For example, the surface finish may be adjusted (e.g., made smoother or rougher) by selecting appropriate laser parameters during the additive process. A rougher finish may be achieved by increasing laser scan speed or a thickness of the powder layer, and a smoother finish may be achieved by decreasing laser scan speed or the thickness of the powder layer. The scanning pattern and/or laser power can also be changed to change the surface finish in a selected area. Notably, a smoother surface may promote a faster flow of fluid through a heat exchanger passageway, while a rougher surface may promote turbulent flow of fluid and increased heat transfer.

The discussion above describes accessory gearbox 100 and its method of construction. However, it should be appreciated that aspects of the present subject matter may be used to manufacture a gearbox having an integral heat exchanger for use with any other suitable device or system. For instance, the gearbox may be an accessory gear box, a transfer gear box, a reduction gearbox, or any other suitable gearbox for a gas turbine engine. Indeed, aspects of the present subject matter may be used to incorporate heat exchangers into any component where void space is available and high temperature gradients may be used to transfer heat energy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gearbox comprising:
   a housing comprising a plurality of walls defining an internal chamber;
   a plurality of gears positioned within the internal chamber;
   an additively manufactured heat exchanger formed within the chamber on at least one of the plurality of walls, the heat exchanger comprising a plurality of heat exchange passageways, wherein the plurality of heat exchange passageways comprise a plurality of first heat exchange passageways that are configured for receiving air, fuel, or oil, and a plurality of second heat exchange passageways that are configured for receiving air, fuel, or oil; and
   at least one load bearing structure that passes through a middle of the heat exchanger, wherein the at least one load bearing structure is formed from a stronger material or has an increased density relative to the heat exchanger.

2. The gearbox of claim 1, wherein the housing and the heat exchanger are additively manufactured as a single, integral piece.

3. The gearbox of claim 2, wherein the housing is additively manufactured using a first material and the heat exchanger is additively manufactured using a second material, the second material being different from the first material.

4. The gearbox of claim 1, wherein a wall of the heat exchanger has a thickness of less than four millimeters.

5. The gearbox of claim 1, further comprising at least one additively manufactured fluid supply conduit, the fluid supply conduit providing fluid communication between a fluid supply and at least one of the plurality of heat exchange passageways of the heat exchanger.

6. The gearbox of claim 5, wherein the fluid supply is located outside of the housing of the gearbox.

7. The gearbox of claim 1, wherein the first heat exchange passageways and the second heat exchange passageways are configured in a cross-flow, counter-flow, or parallel-flow arrangement.

8. The gearbox of claim 1, wherein the gearbox is an accessory gearbox or a transfer gearbox of a gas turbine engine.

9. A method of forming a gearbox, the method comprising:
   additively manufacturing a heat exchanger onto at least one wall of a gearbox housing, the heat exchanger comprising a plurality of heat exchange passageways;
   additively manufacturing at least one load bearing structure that passes through a middle of the heat exchanger, wherein the at least one load bearing structure is formed from a stronger material or has an increased density relative to the heat exchanger; and
   additively manufacturing at least one fluid supply conduit, the fluid supply conduit providing fluid communication between a fluid supply and at least one of the plurality of heat exchange passageways of the heat exchanger, wherein the fluid supply is located outside of the gearbox housing.

10. The method of claim 9, further comprising additively manufacturing the gearbox housing.

11. The method of claim 9, wherein the gearbox housing and the heat exchanger are additively manufactured as a single, integral piece.

12. The method of claim 9, wherein the gearbox housing is additively manufactured using a first material and the heat exchanger is additively manufactured using a second material, the second material being different from the first material.

13. The method of claim 9, wherein a wall of the heat exchanger has a thickness of less than four millimeters.

14. An additively manufactured gearbox comprising:
   a plurality of chamber walls defining a chamber;
   one or more gears positioned within the chamber, a plurality of voids being defined between the gears and the chamber walls;
   at least one heat exchanger additively manufactured on the chamber walls to fill at least one of the plurality of voids, the heat exchanger comprising a plurality of heat exchanging walls, at least one of the heat exchanging walls having a thickness of less than four millimeters;
   at least one load bearing structure that passes through a middle of the heat exchanger, wherein the at least one load bearing structure is formed from a stronger material or has an increased density relative to the heat exchanger; and
   at least one additively manufactured fluid supply conduit, the fluid supply conduit providing fluid communication between a fluid supply located outside the chamber and the heat exchanger.

15. The additively manufactured gearbox of claim 14, wherein the chamber walls and the heat exchanger are additively manufactured as a single, integral piece.

16. The additively manufactured gearbox of claim 15, wherein the chamber walls are additively manufactured using a first material and the heat exchanger is additively manufactured using a second material, the second material being different from the first material.

* * * * *